United States Patent [19]

Rosenthal

[11] 4,027,148

[45] May 31, 1977

[54] VECTOR GENERATOR

[76] Inventor: Lawrence David Rosenthal, 7146 Saroni Drive, Oakland, Calif. 94611

[22] Filed: Sept. 10, 1975

[21] Appl. No.: 612,045

[52] U.S. Cl. ............................... 235/198; 235/151; 315/367; 340/324 A

[51] Int. Cl.[2] ...................... G06F 15/34; G06F 3/14

[58] Field of Search ........... 235/151, 198; 315/367, 315/379, 383, 386; 340/324 A

[56] References Cited

UNITED STATES PATENTS

| | | | |
|---|---|---|---|
| 3,582,705 | 6/1971 | Waller et al. | 315/367 |
| 3,718,834 | 2/1973 | Bacon et al. | 315/367 X |
| 3,728,575 | 4/1973 | Granberg | 315/367 |
| 3,869,085 | 3/1975 | Green | 235/198 |

*Primary Examiner*—Jerry Smith

*Attorney, Agent, or Firm*—David B. Harrison

[57] ABSTRACT

A vector generator having a digital input and a cathode ray tube (CRT) display output is disclosed. Digital values specifying the initial point of the line segment in Cartesian coordinates are converted to proportional voltages applied across the capacitors of two identical resistance-capacitance networks which control the positioning of the CRT beam. A second pair of digital values defining the length and direction of the line segment with respect to the initial point are normalized digitally by left shifts until the larger of the pair equals or exceeds a normalization constant. The normalized values are added to the initial point coordinates, and the sums are then converted to proportional voltages applied to the resistors of the two networks. Simultaneously, a timer preset during the normalization operation is started and the CRT beam is turned on to start the drawing of the line segment. As a result of the normalization, the voltages applied to the RC networks are larger than needed to draw the segment. Consequently, the beam will be turned off by the timer well before the outputs of the RC networks reach the applied voltages. Thus, line segments of widely differing lengths are drawn at a normalized fast rate and are displayed at a normalized uniform visual intensity on the CRT.

8 Claims, 6 Drawing Figures

| LEFT SHIFTS | Δx REGISTER binary | Δx REGISTER decimal | Δy REGISTER binary | Δy REGISTER decimal | TIMER PRESET |
|---|---|---|---|---|---|
| 0 | 01101010010 | 850 | 01010111100 | 700 | 0 |

| Δx NORMALIZED & OFFSET | | Δy NORMALIZED & OFFSET | |
|---|---|---|---|
| 0110101001000 | 3400 | 0101011110000 | 2800 |

FIG 4

| LEFT SHIFTS | Δx REGISTER binary | Δx REGISTER decimal | Δy REGISTER binary | Δy REGISTER decimal | TIMER PRESET |
|---|---|---|---|---|---|
| 0 | 00000010100 | 20 | 11111001110 | -50 | 0 |
| 1 | 00000101000 | 40 | 11110011100 | -100 | 548 |
| 2 | 00001010000 | 80 | 11100111000 | -200 | 794 |
| 3 | 00010100000 | 160 | 11001110000 | -400 | 911 |
| 4 | 00101000000 | 320 | 10011100000 | -800 | 968 |

| Δx NORMALIZED & OFFSET | | Δy NORMALIZED & OFFSET | |
|---|---|---|---|
| 0010100000000 | 1280 | 1001110000000 | -3200 |

FIG 5

VECTOR GENERATOR

BACKGROUND OF THE INVENTION

The present invention relates to apparatus and method for converting digital information into line segment displays on a cathode ray tube display. More particularly, the present invention provides electronic apparatus and method capable of converting digital information into visual line segments of normalized uniform visual intensity on a cathode ray tube display regardless of segment length and without variation of the CRT beam current.

While a variety of vector generators for converting digital information into line segments for visual display is known in the prior art, many generators utilizing cathode ray tube displays were characterized with drawbacks relating to the need to vary the beam current to maintain a visual display of uniform intensities for line segments of differing lengths. Those drawbacks stemmed from the fact that for a constant beam current the display intensity of a cathode ray tube is inversely proportional to the rate of beam deflection. For example, if both a long line segment and a short line segment required the same completion time, the drawing rate (the rate of beam deflection) for the short line segment would be slower than the rate for the longer line segment, and with a fixed beam current the short line segment would appear visibly brighter than the long line segment on the cathode ray tube display.

The various solutions to this problem were generally unsatisfactory because of complicated and expensive circuitry required to normalize visual intensity for line segments regardless of the length thereof. One widely known solution was to vary the intensity of the electron beam in accordance with the line segment length. The circuitry required to implement that solution was necessarily complex because of the wide range of beam currents required, typically greater than 1000 to 1. Also, correcting for visual intensity variations by varying the beam current alone is an inefficient solution because it still allows short line segments to take the same length of time for completion as a long line segment. Allowing the same length of time to draw a short line segment as a long one greatly reduces the number of short line segments that could have otherwise been drawn before refreshing the display.

Another solution calls for varying the drawing rate in accordance with line length. The circuits implementing that solution typically varied resistance or capacitance values, again a very difficult process. Some vector generators besides requiring different beam current and different resistance and capacitance values to draw different length line segments at uniform intensities and speeds, also require the beam current and component values to be varied while a line segment is in the process of being drawn, a still more difficult task.

Accordingly, an object of the present invention is to provide a cathode ray tube display of line segments in a digital format wherein the visual intensity is normalized for various line lengths without varying the intensity of the electron beam and without varying resistance or capacitance values.

Another object of the present invention is to draw line segments on a cathode ray tube display at a fast, efficient, normalized rate.

A further object of the present invention is to implement normalization of cathode ray tube visual display intensity of line segments of varying lengths with high speed digital circuitry.

A still further object of the present invention is to provide a digital vector generator which is uncomplicated, inexpensive to manufacture, and which has the stability and accuracy of a digital vector generator and the speed and line quality of an analog vector generator.

BRIEF SUMMARY OF THE INVENTION

The vector generator of the present invention receives digital coordinate values of the initial point of a line segment to be drawn from a computer or other source of digital information. These values are converted into voltages applied across the capacitors of two identical resistance-capacitance (RC) networks. The voltages across the capacitors thereof fix the initial position of the electron beam on the cathode ray tube (CRT) display.

Digital values defining the length and direction of the line segment are loaded into shift registers and are simultaneously multiplied by powers of two by left shifts until the larger of the two values equal or exceeds a predetermined normalization constant. The normalization results in substantially uniform line drawing rates for line segments having widely differing lengths as well as normalized visual intensities for the line segments regardless of the length thereof.

The values defining the length and direction of the line segment after being normalized are added to the initial point coordinates. The digital sums are then converted into two voltages which are applied to the resistors of the two identical RC networks. Simultaneously, the CRT beam current is turned on enabling a visible line to be drawn on the CRT display. The line traced on the CRT display by the output voltages from the pair of RC networks will be straight. However, the rate at which the straight line is drawn will slow down exponentially with the time from when the input voltages were applied. Because the values defining the length and direction of the line segment are multiplied by a power of two, the voltages applied to the RC networks are larger than those required to draw the line segment given a sufficiently long time. The line segment of the desired length is achieved by removing the voltages across the RC networks and turning off the CRT beam current after the line being drawn has reached the desired length. The voltages applied to the RC networks are sufficiently oversized to assure that the line being drawn will not have slowed down significantly by the time it is terminated. The termination of the line is signalled by a timer with a duration determined by the number of times the values defining the length and direction of the line segment are shifted left.

Other objects, advantages and features of the invention will become apparent from the following detailed description of embodiments presented in conjunction with the accompanying drawings.

BRIEF DESCRIPTION OF THE DRAWINGS

FIG. 4 is a table of the contents of the Δx and Δy shift registers of the generator of FIG. 1 during the normalization of a first line segment example.

FIG. 5 is a table of the contents of the Δx and Δy shift registers during the normalization of a second line segment example.

DESCRIPTION OF A PREFERRED EMBODIMENT

Figure 1:
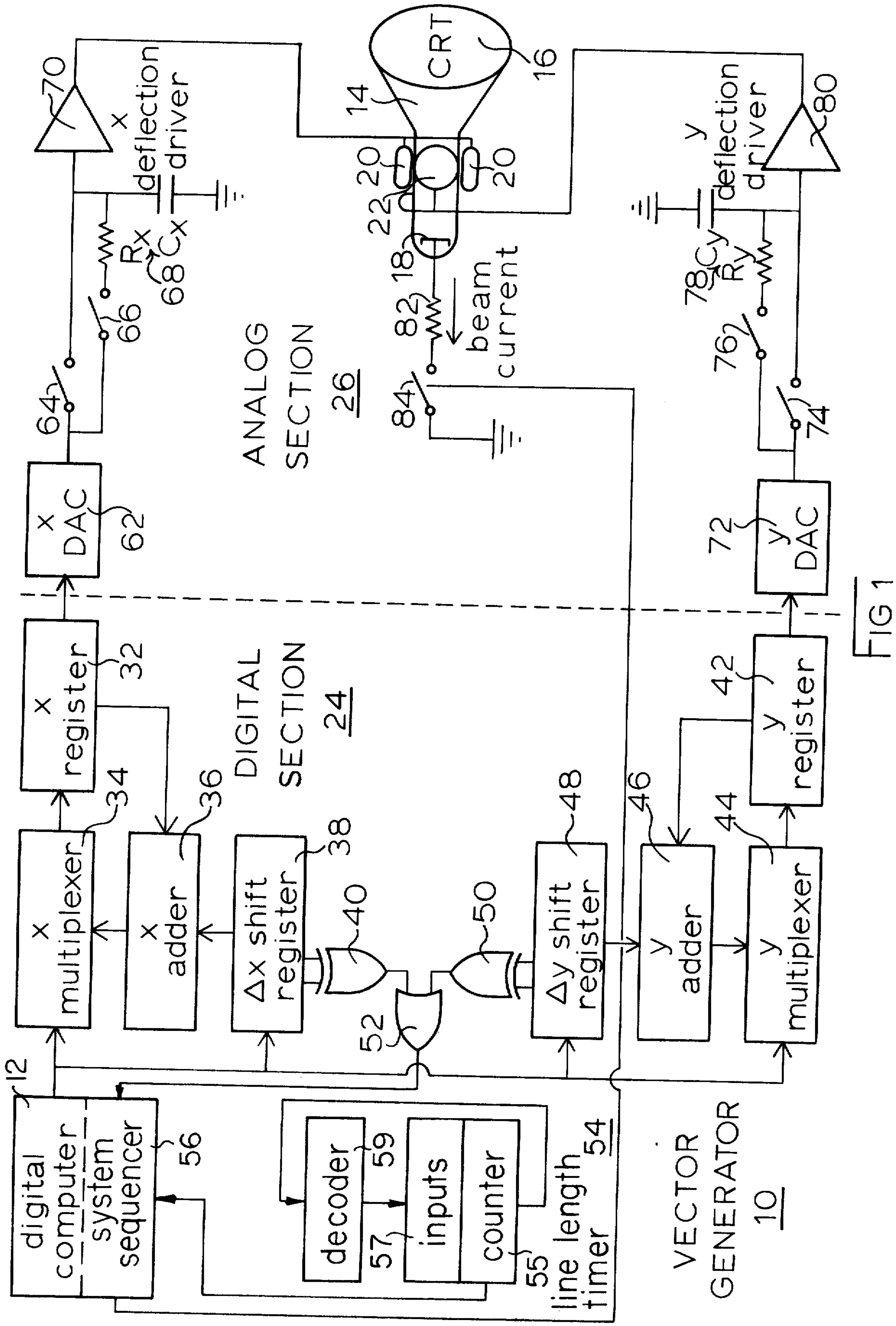
FIG. 1 is a block and partial schematic diagram of a preferred embodiment of a vector generator of the present invention.

As shown in FIG. 1, the vector generator 10 of the present invention receives digitized line drawing information from a digital computer 12 and converts the line information into a display on a cathode ray tube 14 having a screen 16. The cathode ray tube 14 also includes a beam emitting and focussing section 18 and two sets of magnetic deflection coils: *x*-axis deflection coils 20 and *y*-axis deflection coils 22. While a magnetic deflection tube 14 is illustrated, an electrostatically deflected display tube would be equally suitable herein.

The vector generator 10 includes two sections: a digital section 24 and an analog section 26. The digital section 24 may be further subdivided into an *x* component subsection and a *y* component subsection.

The *x* component subsection of the digital section 24 includes an *x* register 32, an *x* multiplexer 34, an *x* adder 36, *a*Δ*x* shift register 38 and an exclusive OR gate 40. The *y* component subsection of the digital section 24 similarly includes a *y* register 42, a *y* multiplexer 44, a *y* adder 46, a Δ*y* shift register 48 and an exclusive OR gate 50. Outputs from the exclusive OR gate 40 of the *x* component subsection and the exclusive OR gate 50 from the *y* component subsection provide the two inputs to an OR gate 52.

Figure 2:
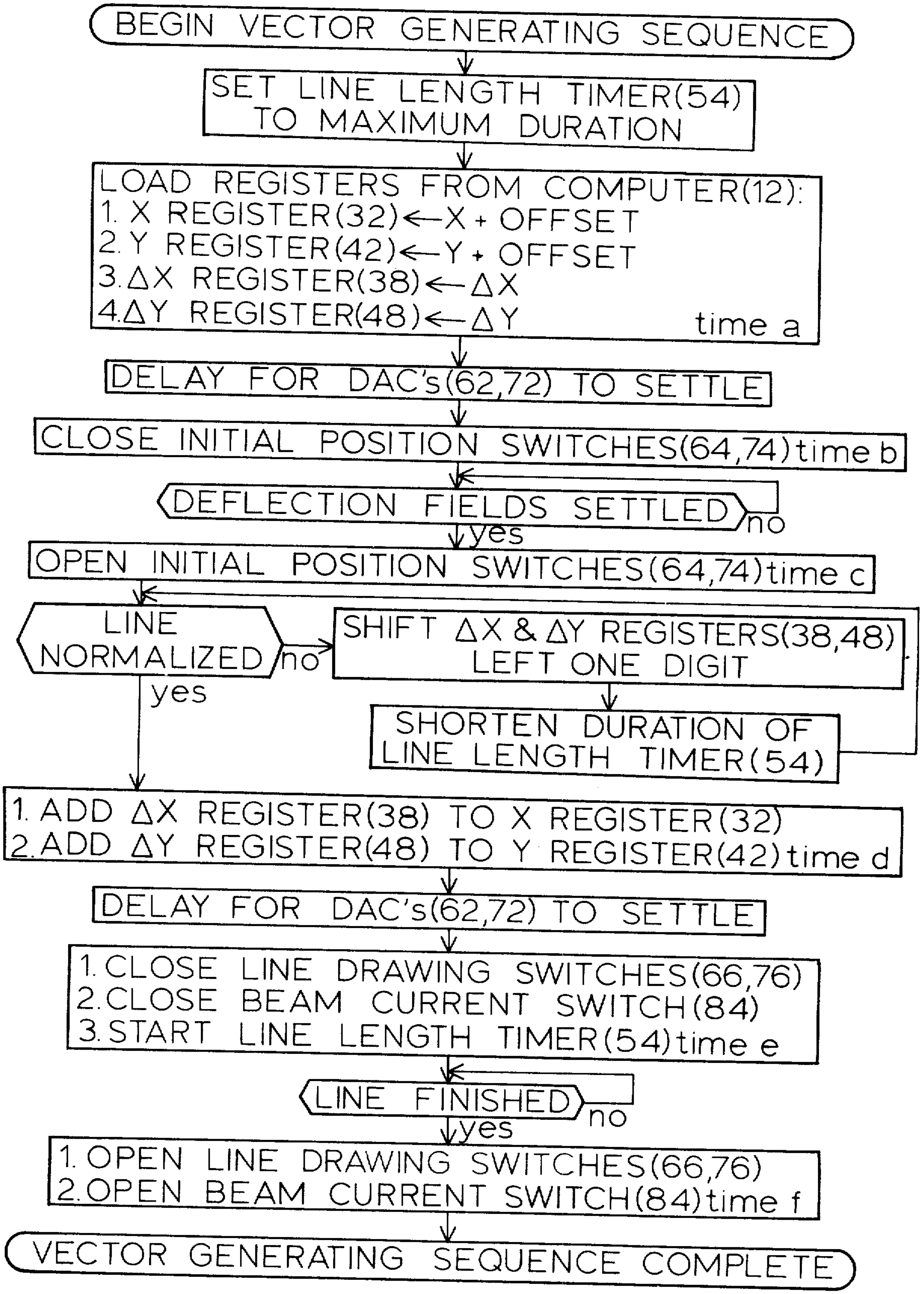
FIG. 2 is a flowchart describing the sequential operation of the vector generator of FIG. 1.

Also included within the digital section 24 is a line length timer 54 which determines the drawing time duration necessary for the vector generator 10 of FIG. 1 to generate line segments of the desired lengths. The timer 54 includes a presettable binary counter 55 having plural preset outputs 57 which are connected from a decoder 59. The decoder 59 generates preset values for the counter 55 based on the previous preset value loaded into the counter 55. The counter 55 is loaded each time a left shift is performed in the Δx and Δy registers 38 and 48. Thus, the preset value generated by the decoder 59 depends upon the number of multiplication repetitions (left shifts) performed in the Δx shift register 38 and the Δy shift register 48 in the normalization operation of the system 10 described hereinafter. After the preset value established in the normalization operation is determined, the counter 55 of the line length timer 54 functions as a timer by counting at a fixed rate from the preset value to a fixed terminal value. Upon reaching the fixed terminal value, the counter 55 generates a completion signal. Included as a part of the digital computer 12 is a system sequencer 56 which receives control signals from the computer 12, the common OR gate 52 and the counter 55 of the line length timer 54. Based upon these inputs the sequencer 56 controls the sequence of operation of the registers, multiplexers and switches of the generator 10 via digital circuitry in accordance with the sequence of events outlined by the flowchart of FIG. 2 in a manner well known to those skilled in the art. The details of the sequencer 56 are omitted herefrom as not constituting a part of the present invention and so as not to encumber the application and thereby obscure the invention hereof.

The analog section 26 of the vector generator 10 is similarly divided into two identical subsections: an *x* component subsection and a *y* component subsection. The *x* component subsection of the analog section 26 includes an *x* component digital-to-analog converter (DAC) 62, an *x* component initial position switch 64, an *x* component line drawing switch 66, an RC shaping network 68 including in combination a resistor $R_x$ and a capacitor $C_x$, and an *x* component deflection driver 70 the output of which is connected to drive the *x* deflection coils 20. The *y* component subsection of section 26 includes a *y* component digital-to-analog converter 72, a *y* component initial position switch 74, a *y* component line drawing switch 76, an RC shaping network 78 including a resistor $R_y$ and a capacitor $C_y$ in electrical combination, and a *y* component deflection driver 80 having its output connected to drive the *y* deflection coils 22. The analog section 26 also includes a beam current switch 84. The beam current switch 84 connects to ground the cathode resistor 82 regulating the beam current of cathode ray tube 14. The switches 64, 66, 74, 76 are all digitally controlled field effect transistors. Switch 84 is a digitally controlled bipolar switching transistor.

Figure 6:
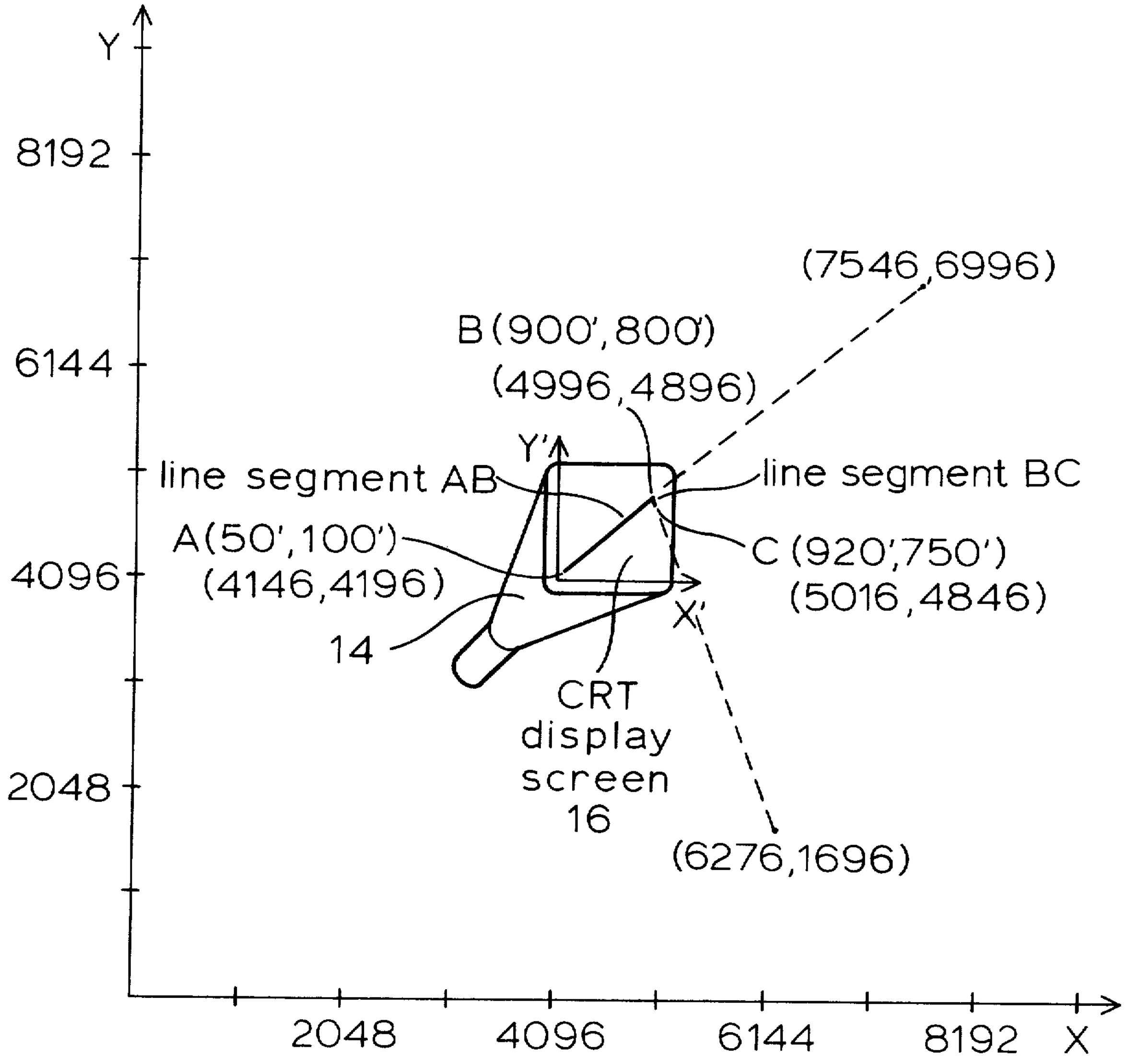
FIG. 6 is a diagram of the coordinate grid containing all intermediate and final points generated by the generator of FIG. 1 and shows the relation of the actual viewing area of the cathode ray tube display device to the total grid.

The operation of the vector generator 10 may best be described by explaining in sequence the steps which are followed to draw line segments. The example chosen for this purpose involves drawing a pair of line segments: a long line AB and a short line BC as shown in FIG. 6 as being on the screen 16 of the cathode ray tube 14. This screen 16 has been divided into an *x*—*y* grid of 1,024 by 1,024 positions. It is but a small square area of the much larger coordinate grid as shown in FIG. 6. The following description explains the sequence of operations necessary to draw a line segment as set forth in the flowchart of FIG. 2.

The line length timer 54 is initialized by presetting the value of zero into its presetable binary counter. Next, $x = 50'$ and $y = 100'$ (being the coordinates of point A of FIG. 6) are loaded from the computer 12 into the *x* register 32 and *y* register 42 respectively through the *x* multiplexer 34 and the *y* multiplexer 44. Point A, as shown in FIG. 6, is the starting position of the line segment AB to be drawn by the vector generator of the present invention. The *x* register 32 now contains the number 4146 which is 50 offset by 4096, and the *y* register 42 contains 4196, which is 100 offset by 4096. For reasons of economy and simplicity the digital-to-analog converters 62 and 72 which are used to convert the digital numbers contained in the *x* and *y* registers into analog voltages, are only capable of converting positive numbers. Thus, the 4096 unit offset is selected to assure that the values contained in the *x* register 32 and the *y* register 42 will always be positive. The 4096 offset is achieved by loading a one into bit 12 of both the *x* register 32 and the *y* register 42 at the same time that the *x* and *y* coordinates are loaded (the number 4096 being equivalent to $2^{12}$). The primed numbers (50' and 100') are the *x* and *y* coordinates relative to the edges of the display 16, which are the values of the coordinates before being offset. $\Delta x=850$ and $\Delta y=700$, the parameters defining the length and direction of the line segment AB generated by the computer 12 are then loaded into the $\Delta x$ shift register 38 and the $\Delta y$ shift register 48 respectively. The $\Delta x$ and $\Delta y$ parameters represent the differences between the coordinates of the end points of the line segment being drawn. The $\Delta x$ shift register 38 now contains the number 850 and the $\Delta y$ shift register 48 now contains the number 700. The $x$ and $y$ parameters and the $\Delta x$ and $\Delta y$ parameters are assumed for purposes of explanation to have been loaded into the $x$ and $y$ registers 32 and 42 and the $\Delta x$ and $\Delta y$ shift registers 38 and 48 at time a (which is marked on the waveforms of FIG. 3).

For purposes of the present example, the $x$ digital-to-analog converter 62 and the $y$ digital-to-analog converter 72 will convert 14-digit non-signed binary numbers into proportional voltages between zero and 16.383 volts (the number 16,383 being equivalent to $2^{14}$-1). The number 1000 to base 10, for example, would be converted into 1.000 volts. Whenever a change occurs in the digital number driving a digital-to-analog converter, a time delay is provided to allow the output voltage from that digital-to-analog converter to settle at the new value.

Figure 3:
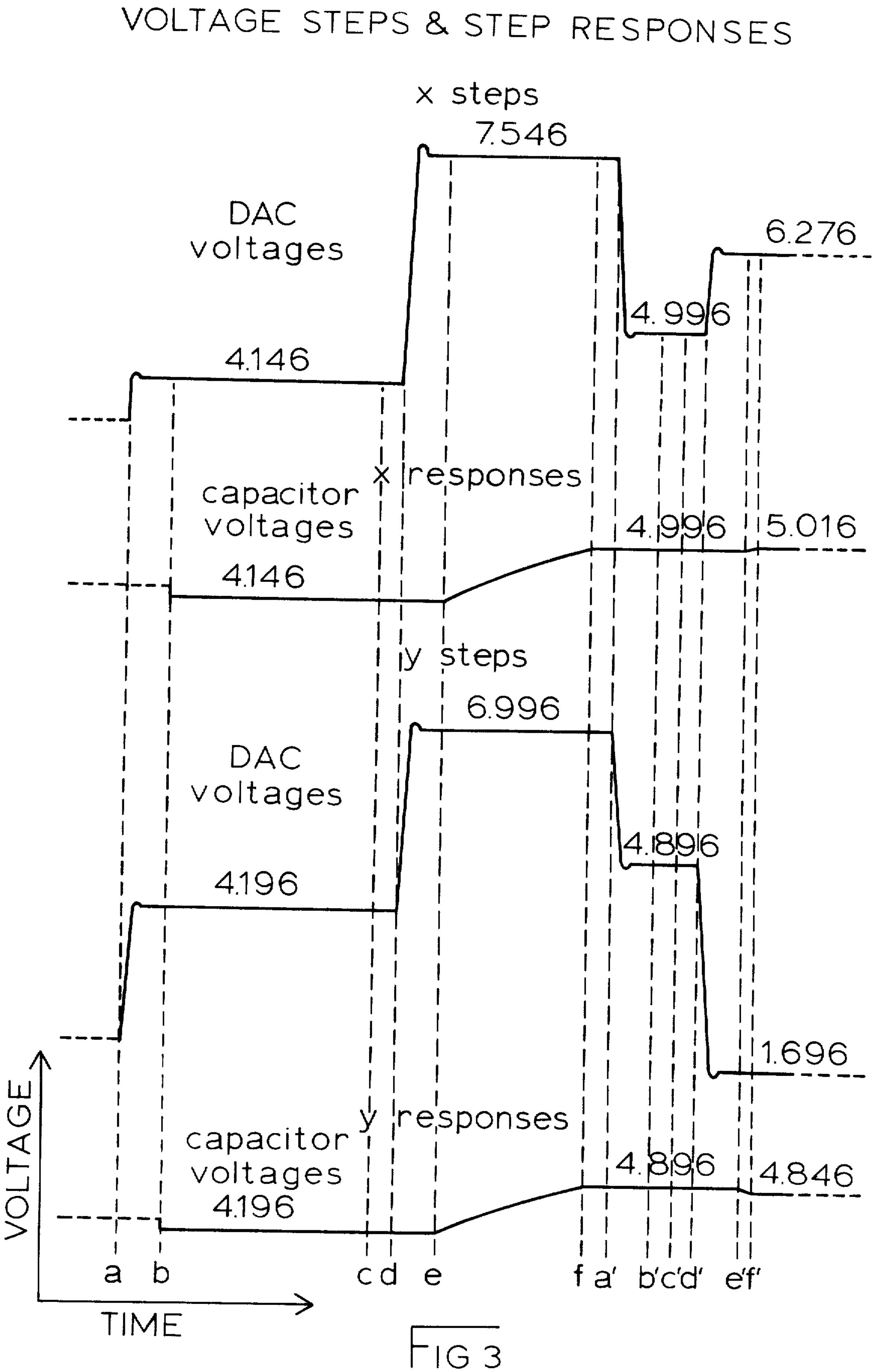
FIG. 3 is a wave form diagram illustrating voltage steps and step responses as a function of time as generated by the generator of FIG. 1 during the generation of the two line segment examples of FIG. 6.

Referring to FIG. 3, at time *b* after the digital-to-analog converters 62 and 72 have settled, with the $x$ digital-to-analog converter 62 generating 4.146 volts, and the $y$ digital-to-analog converter 72 generating 4.196 volts, the $x$ component initial position switch 64 and the $y$ component initial switch position 74 are closed simultaneously. Closing the switches 64 and 74 connects the $x$ and $y$ digital-to-analog converters respectively to the capacitors of the identical RC networks 68 and 78. This connection enables the capacitor $C_x$ and $C_y$ to charge quickly with capacitor $C_x$ charging to 4.146 volts and capacitor $C_y$ charging to 4.196 volts as shown in FIG. 3. It is to be understood that prior to closing the switches 64 and 74, the capacitors $C_x$ and $C_y$ were charged to voltage levels corresponding to the position of the terminal end point of the previously generated line segment. The switches 64 and 74 remain closed until the capacitors $C_x$ and $C_y$ are charged and the cathode ray tube deflection fields generated by the coils 20 and 22 have settled at the values required to position the electron beam at the starting position having an $x$ component value of 4146 and a $y$ component of 4196 (50', 100' on the screen 16 in FIG. 6). The time required for the deflection fields to settle is a function of the distance required to reposition the electron beam from the terminal end of the previously completed line. The computer 12 can calculate the distance by which the electron beam is being repositioned and then determine the appropriate amount of settling time to be provided. An alternative technique for determining that the deflection fields have settled involves determining that the currents in the coils 20 and 22 (or voltages applied to electrostatic deflection elements) which are generating the deflection fields have reached a constant value. In the case of the magnetic deflection system illustrated, a drop in the voltages across the deflection coils would indicate settling. The circuitry required to sense settling of the driving signals is well understood by those skilled in the art and will not be described in more detail herein. After the deflection fields have settled, the $x$ and $y$ component initial position switches 64 and 74 are simultaneously opened. This occurs at *a* time *c* as illustrated in FIG. 3. It is to be understood that the input impedances to the $x$ and $y$ deflection drivers 70 and 80 are sufficiently high to prevent capacitors $C_x$ and $C_y$ from discharging when the switches 64 and 74 are opened. The voltage levels of the capacitors $C_x$ and $C_y$ are unaffected by the output voltages from the digital-to-analog converters 62 and 72 after opening the switches 64 and 74.

In accordance with the present invention, the $\Delta x$ and $\Delta y$ parameters previously loaded into the $\Delta x$ and $\Delta y$ shift registers 38 and 48 from the computer 12 are now normalized to achieve a normalized drawing rate thus, a normalized visual display intensity. FIG. 4 illustrates the contents of the $\Delta x$ and $\Delta y$ registers 38 and 48 prior to shifting, and after each left shift. The contents are shown in both binary and decimal format. Also shown in FIG. 4 is the value which is preset into the line length timer 54 after each left shift. $\Delta x$ and $\Delta y$ are normalized when the contents of either of the shift registers 38 and 48 equal or exceed a normalization constant, the constant being 512 or −513 in the present example. A zero in bit 10 indicates that the contents of the shift register 38 or 48 is positive and that a number greater than or equal to 512 is recognized by a one bit 9 (the number 512 being equivalent to $2^9$). Conversely, a one in bit 10 indicates that the contents of the shift register 38 or 48 is negative and that a number less than or equal to −513 is recognized by a zero in bit 9. Thus, whether the $\Delta x$ or $\Delta y$ parameters are either positive or negative, normalization is indicated by a dissimilarity between bits 9 and 10 in either of the shift registers 38 or 48. In the present invention normalization is indicated by a high level on the output of the OR gate 52 which receives digital signals from the exclusive OR gates 40 and 50. The exclusive OR gate 40 is connected to bit 9 and 10 of the $\Delta x$ shift register 38, and the exclusive OR gate 50 is connected to bits 9 and 10 of the $\Delta y$ shift register 48. The output of an exclusive OR gate is high only when its two inputs are dissimilar. The $\Delta x$ shift register 38 which contained 850 and the $\Delta y$ shift register 48 which contained 700 as shown in FIG. 4 were normalized to begin with; thus, they were not shifted at all. Because the $\Delta x$ and $\Delta y$ parameters were already normalized and required no shifting, the value preset into the line length timer 54 remained zero.

Referring again to FIG. 3 at time *d* the normalized contents of the $\Delta x$ and $\Delta y$ shift registers 38 and 48, being offset two places to the left (multiplied by 4 as shown in FIG. 4), are added together with the contents of the $x$ and $y$ registers 32 and 42 in the $x$ and $y$ adders 36 and 46. The two sums generated are then loaded back into the $x$ and $y$ registers 32 and 42 respectively, through the $x$ and $y$ multipliers 34 and 44. After the summation, the $x$ and $y$ registers contain the numerical values 7546 (3400 + 4146) and 6996 (2800 + 4196) respectively.

At a time *e*, after the $x$ and $y$ digital-to-analog converters 62 and 72 have settled at 7.546 and 6.996 volts, respectively, the $x$ component line drawing switch 66 and the $y$ component line drawing switch 56 are simultaneously closed along with the beam current switch 84, and the line length timer 54 (being previously preset to zero) is started. The line segment AB which starts at point A is now being drawn on the screen 16 of the cathode ray tube 14.

Closing the switches 66 and 76 connects the capacitors $C_x$ and $C_y$ to the $x$ and $y$ digital-to-analog converters 62 and 72 respectively through the resistors $R_x$ and $R_y$. This connection generates a pair of voltage steps across each RC network. The sizes of the voltage steps applied to the RC network 68 and 78 are equal to the differences between the voltages generated by the $x$ and $y$ digital-to-analog converters 62 and 72 and the respective voltages across the capacitors $C_x$ and $C_y$ immediately prior to closing the final position switches 66 and 76. The $x$ and $y$ voltage steps of 3.400 and 2.800 volts respectively are proportional to the offset contents of the $\Delta x$ and $\Delta y$ registers 32 and 42 as shown in FIG. 4.

Closing the beam current switch 84 produces a visible line on the screen 16 of the CRT as the deflection fields are varied in accordance with the voltage step responses present across the capacitors of the RC networks 68 and 78.

As previously explained, the line length timer 54 is started at the preset count of zero and runs for a time which is proportional to 1023 clock periods. At time $f$ as shown in FIG. 3, which is determined when the line length timer reaches the count of 1023, the final position switches 66 and 76 and the current switch 84 are opened. The beam current is thus turned off and the line segment AB is now completed. The dashed lines of FIG. 6 show the line segments that would have resulted if the step responses were allowed to approach the levels of the applied voltages.

The voltages across the capacitors $C_x$ and $C_y$ between time $e$ and time $f$, shown in FIG. 3, are the step responses of the RC networks 68 and 78 terminated after reaching voltage levels equal to 25 percent of the applied steps. Terminating the line segment after the capacitors reached a voltage level equal to 25 percent of the applied steps was necessary because the $\Delta x$ and $\Delta y$ parameters defining the length and direction of the line segment were multiplied to four times their original values by the offset at the time of the addition. If $\Delta x$ and $\Delta y$ were used without being multiplied, a pair of integrators instead of the RC networks 68 and 78 would be required to draw the line at a uniform rate. Using the RC networks 68 and 78 would result in a line drawn at an exceptionally decreasing rate and requiring an infinite completion time. The step response of an RC network during the first 25 percent of rise approximates a linear voltage ramp; the response that would be achieved using an ideal integrator. Thus, using oversized voltage steps two simple identical passive RC networks 68 and 78 can be used in place of more complex integrators which have inherent drift problems and require critical adjustments.

The shorter line segment BC will be drawn following steps very similar to those followed to draw line segment AB. The line length timer 54 is again preset to zero. The $x$ and $y$ coordinates of point B ($x = 900'$ and $y = 800'$) are loaded from the computer 12 into the $x$ and $y$ registers 32 and 42. After the $x$ and $y$ corrdinates are loaded, along with the 4096 offsets, the $x$ and $y$ registers 32 and 42 contain the numbers 4996 and 4896, respectively. $\Delta x = 20$ and $\Delta y = -50$, the parameters defining the length and direction of line segment BC, are loaded from the computer 12 to the $\Delta x$ and $\Delta y$ shift registers 38 and 48. The $\Delta x$ and $\Delta y$ shift registers 38 and 48 now contain the numbers 20 and –50 respectively. The $x$, $y$, $\Delta x$, $\Delta y$ parameters have been assumed to have been loaded into the respective registers by time $a'$ as shown in FIG. 3.

At time $b'$ after the digital-to-analog converters 62 and 72 have settled with the $x$ converter 62 generating 4.996 volts and the $y$ converter 72 generating 4.896 volts (as shown in FIG. 3), the initial position switches 64 and 74 are closed. As will be remembered from the discussion of the generation of the line segment AB, the switches 64 and 74 remained closed until the capacitors $C_x$ and $C_y$ charged to the voltages being generated by the digital-to-analog converters 62 and 72, respectively, and until the deflection fields had settled at the values required to position the electron beam at the initial point of the line segment on the screen 16. In the present situation, where the line segment BC is starting from the final position of line segment AB, the voltages across the capacitors $C_x$ and $C_y$ and the magnitudes of the deflection fields are already of the correct values before the switches 64 and 74 are closed. Even so, the switches 64 and 74 are closed for a brief period to correct for any drift or other minor errors. FIG. 3 shows the voltages across the capacitors $C_x$ and $C_y$ remaining at 4.896 and 4.996 volts respectively between time $b'$ and time $c'$.

As line segment BC is considerably shorter in length than the preceding segment AB, the parameters $\Delta x$ and $\Delta y$ defining the length and direction of line segment BC will be normalized so as to produce a drawing rate very close to that used in drawing the segment AB. The contents of the $\Delta x$ and $\Delta y$ shift registers 38 and 48, prior to shifting and after each left shift, are illustrated in FIG. 5 in both binary and decimal format. Also shown in FIG. 5 is the value preset into the timer 54 after each left shift. As previously stated, the $\Delta x$ and $\Delta y$ parameters are normalized when the contents of the ninth and tenth bit positions in either of the two shift registers 38 or 48 are dissimilar. The dissimilarity between the two digits in either of the shift registers 38 or 48 is indicated by a high level on the output of the OR gate 52 common to the exclusive OR gates 40 and 50.

In the present example of line segment BC, the $\Delta x$ and $\Delta y$ shift registers 38 and 48 which originally contained 20 and –50, respectively, were shifted left four times before normalization was achieved (FIG. 5). After normalization, the $\Delta x$ and $\Delta y$ shift registers 38 and 48 contained the numerical values of 320 and –800 respectively (FIG. 5) and the value preset into the line length timer 54 was 968. Thus, the parameters defining the length and direction of the line segment were increased by a factor of 16 (16 being equivalent to $2^4$ a result of the 4 left shifts) while the drawing time was reduced from 1023 line length timer clock periods to 56 (1023-968) clock periods.

The number 968 which is now on the counter of the line length timer 54 was determined by the four left shifts required for normalization. For the up to 9 left shifts that may be necessary to normalize $\Delta x$ and $\Delta y$ there is a decoder in the line length timer 54 that converts the sequentially received left shift pulses into 1 of 9 preset values. The preset values cause the line length timer 54 to control the drawing times of line segments having $\Delta x$ and $\Delta y$ normalized by different numbers of left shifts such that line segments of the desired lengths are generated.

At time $d'$ the normalized contents of the $\Delta x$ and $\Delta y$ shift registers 38 and 48 offset two places to the left (multiplied by 4 as shown in FIG. 5) are added to the contents of the $x$ and $y$ registers 32 and 42, respectively. After the summation, the $x$ and $y$ registers contain the numerical values of 6276 (4996 + 1280) and 1696 (4896–3200) respectively.

At time $e'$ after the $x$ and $y$ digital-to-analog converters 62 and 72 have settled at 6.276 and 1.696 volts respectively, the line drawing switches 66 and 76 are closed, the beam current is turned on by closure of the switch 84 and the line length timer 54 is started. Line segment BC is now being drawn on the screen 16 of the CRT 14. Closing the line drawing switches 66 and 76 causes voltage steps of 1.280 and −3.200 volts respectively, to appear across the RC networks 68 and 78. For determining the drawing time of line segment BC of the present example the line length timer 54 is started at the preset count of 968 and runs for a time equal to 56 clock periods.

The voltages across the capacitors $C_x$ and $C_y$ between times $e'$ and $f'$ are the step responses of the RC networks 68 and 78 as terminated after a time duration corresponding to voltage levels equal to 1/64th of the applied voltage steps having been reached. The voltage steps applied to the RC networks 68 and 78 through switches 66 and 76 were 64 times larger than necessary to draw the line given an infinite length of time. The factor of 64 being a combination of the factor of 16 resulting from the normalization and the factor of 4 resulting from the offset required to enable the RC networks 66 and 76 to approximate integrators.

A $2\sqrt{2}$ variation factor in the drawing rate results from the method used to normalize the $\Delta x$ and $\Delta y$ parameters. Ideally, the factor by which the $\Delta x$ and $\Delta y$ components are normalized would be based on the length of the line segment described by $\Delta x$ and $\Delta y$. The length of the line segment being equal to $\sqrt{\Delta x^2 + \Delta y^2}$. Calculating the exact length is impractical however, since squaring and square root functions require substantial amounts of digital hardware and processing time. In the present invention, the length of the line segment is estimated by determining it to be equal to the larger one of $\Delta x$ and and $\Delta y$. This estimate is performed during the operation determining normalization by either or both $\Delta x$ and $\Delta y$ equalling or exceeding a normalization constant. When either $\Delta x$ or $\Delta y$ is equal to zero, the estimate yields the exact length, and when the magnitudes of $\Delta x$ and $\Delta y$ are equal, the worst case exists with the estimate short by a factor of the $\sqrt{2}$. The factor of 2 in the drawing rate variation factor occurs because normalization is based on the contents of a single high order bit. The less significant bits are not looked at during normalization permitting a normalized number to be of any value over a 2 to 1 range. The contents of more than a single bit could be used to provide information for narrowing the variation factor if a normalization procedure other than left shifting (multiplying by powers of two) were employed.

For a constant cathode ray tube beam current, the $2\sqrt{2}$ worst case variation factor in the drawing rate will cause a similar worst case intensity variation between different lines. In most display applications for human viewing such as in simulators or videogame devices, the intensity variations between the various lines will not be objectionable, particularly because the human eye perceives light intensities logarithmically and the different intensity levels within the range of variations permitted by the present invention would be very difficult to discern.

It is to be understood that the line segments drawn by the vector generator of the present invention will be redrawn periodically if a continuous display is desired. for most CRT displays, between 30 and 50 frames per second are necessary to eliminate any noticeable flicker. To generate a flicker free display composed of many line segments the frequency of the clock driving the digital section of the generator 10 will be on the order of 10 MHz. Thus, the bipolar technology found in the transistor transistor logic (TTL) logic circuits would have sufficient speed to implement the present invention.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. Method for drawing line segments having normalized visual intensity on a cathode ray tube display screen from digital information including for each segment the steps of:

a. receiving a first set of digital values of planar coordinates of a starting point of a line segment to be drawn from a source of digital information;
b. converting said digital starting point values into deflection voltages directly related to the magnitudes of said values;
c. charging a pair of matched passive networks having the same predetermined time constant which remains unchanged regardless of line segment length of the respective levels of said deflection voltages;
d. positioning a drawing beam of said display at said starting point by said deflection voltages stored in said networks;
e. normalizing a second set of digital values defining said line segment relative to the starting point thereof by repeatedly multiplying said second set of digital values by the same factor until the layer of the two final products resulting therefrom equals or exceeds a predetermined normalization constant;
f. digitally adding each of said two final products to the corresponding one of said starting point coordinate values respectively to produce digital sums;
g. converting said digital sums into drawing voltages directly related to the magnitudes of said sums;
h. turning on said beam to start drawing, and simultaneously applying said drawing voltages to said charged networks to deflect said beam along the display locus of said segment to be drawn;
i. reducing the drawing time required to complete said segment by an amount related to the number of multiplication repetitions utilized in normalizing said digital values defining said line segment relative to the starting point;
j. turning off said drawing beam when a terminal end of said segment has been reached.

2. The method as set forth in claim 1 wherein normalization of said digital values defining said line segment relative to the starting point thereof is accomplished by repeatedly multiplying said second set of digital values by the factor of two until the larger of the products resulting therefrom equals or exceeds a predetermined normalization constant.

3. The method as set forth in claim 1 wherein said drawing beam is turned off when said charging networks have charged to voltage levels which are less than half the applied drawing voltages.

4. The method as set forth in claim 3 wherein said voltage levels corresponding to the position of said drawing beam being at the terminal end of said line segment are determined by the termination of a time duration determined during said normalization step.

5. The method as set forth in claim 1 wherein the drawing rates of said line segments are normalized within a factor of 2 $\sqrt{2}$. repetitions utilized in normalizing said digital values defining said line segment relative to the starting point;

j. turning off said drawing beam when a terminal end of said segment has been reached.

6. Improved electronic apparatus for drawing a line segment having normalized visual intensity without regard to line segment length on a screen of a cathode ray tube display without variation of beam current, from coordinate information supplied by a digital computer connected to said apparatus, said computer including a system sequencing means for sequencing between operations, said improved apparatus including in combination:

a. digital register means for holding coordinate values of a starting point of a said line segment to be drawn;

b. digital shift register means for holding values defining the length and direction of said line segment relative to said starting point and for multiplying said length and direction values by a factor in said digital register means until the larger of the two resultant final products equals or exceeds a predetermined normalization constant;

c. digital adder means for adding said final products to said starting point values to produce sums and for transferring said sums into said digital register means;

d. digital to analog converter means connected to said digital register means for converting said starting point coordinate values into proportional voltages during a first time interval and for converting said sums into proportional voltages during a second time interval;

e. two passive networks having equal time constants that remain constant without regard to line segment length;

f. two beam deflection drivers, each being connected to one of said networks and to said display for deflecting a drawing beam thereof along a locus defining each said line segment in accordance with the instantaneous voltage levels of said networks;

g. first switch means connected between said digital to analog converter means and said networks for charging said networks to said starting point proportional voltages during said first interval;

h. system sequencer means in said digital computer and connected to a beam control element of said display and to said shift register means for turning on said beam when said sum voltages are applied to said networks and for turning off said beam;

i. line length timer means connected to said system sequencer means for signalling beam turn off after a time interval determined by said line length timer means in response to a function of the number of multiplications performed by said shift register means in generating said products.

7. The electronic apparatus of claim 6 wherein said digital shift register means comprises two shift registers, each said shift register having predetermined bit positions connected to provide inputs to one of two exclusive OR gates, the outputs of said exclusive OR gates providing the inputs to a two input OR gate, having an output which is connected to provide an input of said system sequencing means, whereby dissimilar bits in said predetermined bit positions of one or both of said shift registers indicate to said sequencing means the completion of normalization.

8. The electronic apparatus of claim 6 wherein said digital line length timer and control means includes a digital counter with an output signalling completion of said line segment upon reaching a predetermined count and preset inputs connected to a decoder generating preset values as a function of the number of multiplication repetitions performed in generating said products.

* * * * *

UNITED STATES PATENT AND TRADEMARK OFFICE

CERTIFICATE OF CORRECTION

PATENT NO. : 4,027,148

DATED : May 31, 1977

INVENTOR(S) : LAWRENCE DAVID ROSENTHAL

It is certified that error appears in the above-identified patent and that said Letters Patent are hereby corrected as shown below:

Column 3, line 46, change "outputs" to --inputs--;

line 51, before "registers 38 and 48" add --shift--;

Column 5, lines 33-34, "capacitor" should read --capacitors--;

Column 7, line 40, "exceptionally" should read --exponentially--;

Column 9, line 64, "for" should read --For--;

Column 10, line 26, change "length of" to --length to--;

line 34, "layer" should read --larger--;

Column 11, line 3, after "factor of $2\sqrt{2}$.", delete "repetitions utilized in normalizing said digital values defining said line segment relative to the starting point;

"j. turning off said drawing beam when a terminal end of said segment has been reached."

Column 12, line 27, "input of" should read --input to--.

Signed and Sealed this

*Twenty-seventh* Day of *September 1977*

[SEAL]

*Attest:*

RUTH C. MASON
*Attesting Officer*

LUTRELLE F. PARKER
*Acting Commissioner of Patents and Trademarks*